United States Patent
Shah et al.

(10) Patent No.: US 10,104,319 B2
(45) Date of Patent: *Oct. 16, 2018

(54) DECORRELATED CHANNEL SAMPLING FOR DIGITAL IMAGING

(71) Applicant: Hologic, Inc., Bedford, MA (US)

(72) Inventors: Dhruvish Sudhirbhai Shah, Newark, DE (US); Brad Polischuk, Wilmington, DE (US); Eugene Palecki, Landenberg, PA (US); Anthony Celona, Lincoln University, PA (US); Douglas Myers, Kennett Square, PA (US); Glenn Walker, Middletown, DE (US)

(73) Assignee: HOLOGIC, INC., Marlborough, MA (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/623,360

(22) Filed: Feb. 16, 2015

(65) Prior Publication Data

US 2015/0281604 A1    Oct. 1, 2015

Related U.S. Application Data

(63) Continuation of application No. 13/494,665, filed on Jun. 12, 2012, now Pat. No. 8,958,001, which is a
(Continued)

(51) Int. Cl.
*H04N 5/357* (2011.01)
*H04N 5/32* (2006.01)
*H04N 5/378* (2011.01)

(52) U.S. Cl.
CPC ............ *H04N 5/3575* (2013.01); *H04N 5/32* (2013.01); *H04N 5/378* (2013.01)

(58) Field of Classification Search
CPC ...... H04N 5/378; H04N 5/335; H04N 5/3575; H04N 3/155; H04N 5/374
See application file for complete search history.

(56) References Cited

U.S. PATENT DOCUMENTS

| 4,677,490 A | 6/1987 | Levine |
| 6,042,012 A | 3/2000 | Olmstead et al. |
| (Continued) | | |

FOREIGN PATENT DOCUMENTS

| JP | 2007-141227 | 6/2007 |
| JP | 2008-086000 A | 4/2008 |

OTHER PUBLICATIONS

PCT International Search Report and Written Opinion in International Application PCT/US2011/029148, dated Sep. 13, 2011, 9 pgs.
(Continued)

*Primary Examiner* — Twyler Haskins
*Assistant Examiner* — Fayez Bhuiyan

(57) ABSTRACT

In association with an imaging device which generates a portion of an image from a plurality of channels within a first row by sampling each channel during a sampling time corresponding to the channel, circuitry offsets sampling times of at least first and second channels within the first row, thereby reducing noise correlation between the first and second channels in the first row. Pixel sampling times may be defined by start times of the channels within a row, end times or both. Offsetting may be accomplished using a predetermined set of sampling time values or by randomizing sampling time values. Offsetting pixel sampling times of channels within a row relative to each other decorrelates channel sampling because different phases of the noise signal are sampled on each channel, effectively blurring or dithering the channel noise within each row. Random sampling within the channel, such as by varying a channel
(Continued)

sampling time between rows, further dithers the noise within each channel. Undesirable correlated noise effects are reduced as a result.

20 Claims, 11 Drawing Sheets

Related U.S. Application Data continuation of application No. PCT/US2011/029148, filed on Mar. 21, 2011.

(60) Provisional application No. 61/316,266, filed on Mar. 22, 2010.

(56) References Cited

U.S. PATENT DOCUMENTS

| | | | |
|---|---|---|---|
| 6,977,685 B1 | 12/2005 | Acosta-Serafini et al. | |
| 7,352,497 B2 | 4/2008 | Hori | |
| 7,564,038 B2 * | 7/2009 | Endo | H04N 5/32 250/370.11 |
| 8,958,001 B2 | 2/2015 | Shah et al. | |
| 2004/0165093 A1 | 8/2004 | Dosluoglu et al. | |
| 2005/0078339 A1 | 4/2005 | Hori | |
| 2008/0079830 A1 | 4/2008 | Lepage | |
| 2009/0040351 A1 | 2/2009 | Cho | |
| 2009/0090846 A1 | 4/2009 | Stevens et al. | |
| 2009/0128676 A1 * | 5/2009 | Tanaka | H04N 5/335 348/300 |
| 2009/0166515 A1 | 7/2009 | Boemler | |
| 2009/0201373 A1 | 8/2009 | Yamaguchi | |
| 2009/0242738 A1 | 10/2009 | Yan | |

OTHER PUBLICATIONS

European Search Report in Application 11759969.6, dated Apr. 1, 2015, 7 pgs.

Japanese Office Action for corresponding Japanese Patent Application No. 2015-181866 dated Nov. 8, 2016, 8 pgs.

* cited by examiner

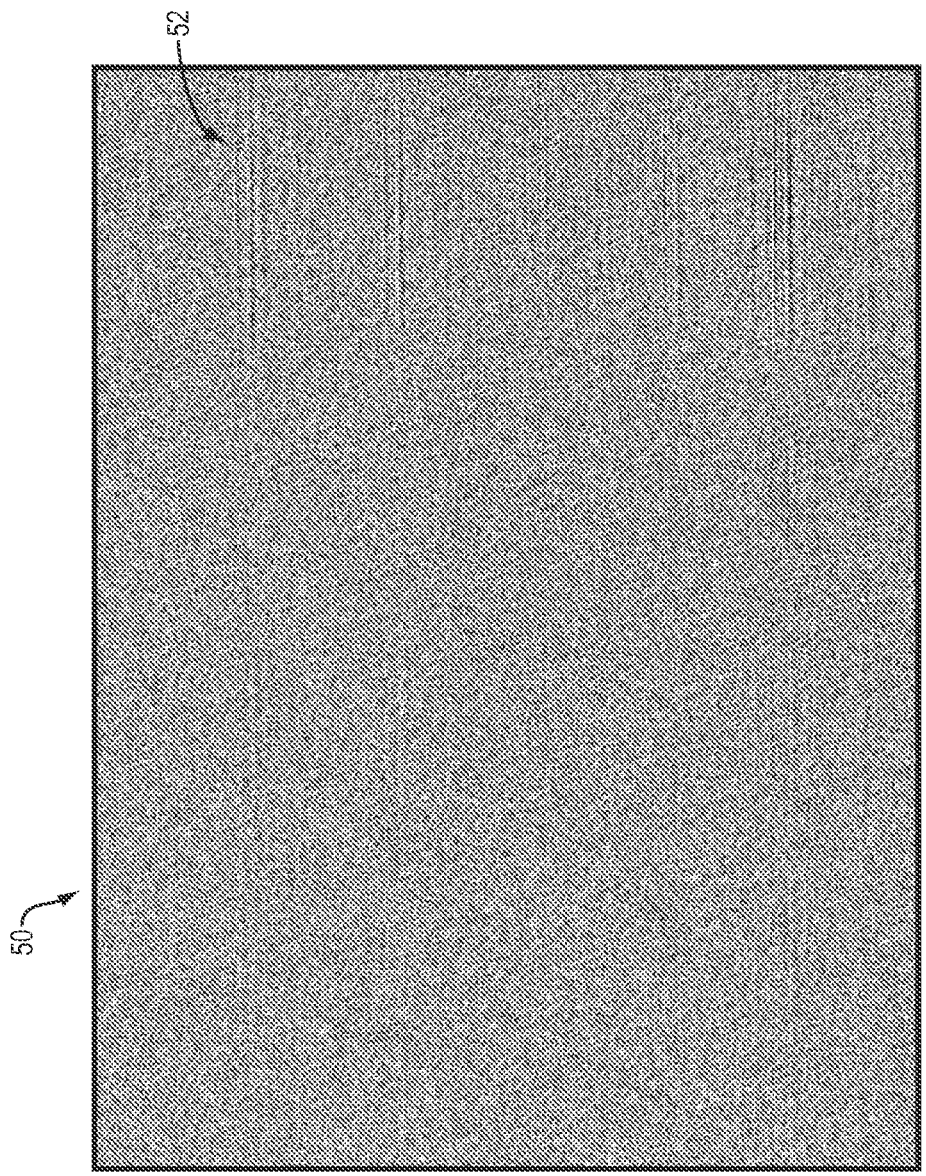

DECORRELATED CHANNEL SAMPLING FOR DIGITAL IMAGING

CROSS-REFERENCE TO RELATED APPLICATIONS

This application is a continuation of U.S. patent application Ser. No. 13/494,665, filed on Jun. 12, 2012; which is a continuation of International Application Serial No. PCT/US2011/029148, filed on Mar. 21, 2011; for which a claim of priority is made to U.S. Provisional Patent Applicant Ser. No. 61/316,266, titled "System, Apparatus and Method for Decorrelated Channel Sampling in Image Detectors," filed Mar. 22, 2010, the disclosures of which are hereby incorporated by reference herein in their entireties.

FIELD OF THE INVENTION

This invention relates generally to the field of digital imaging, and more particularly to reducing correlated or structured noise artifacts in a digital image.

BACKGROUND OF THE INVENTION

Digital images based on x-rays, magnetic resonance, optics and other modalities are widely used in the medical field. For example, x-ray images are used by radiologists to screen for calcifications, lesions, masses or patterns which may be indicative of cancer. It can therefore be appreciated that the accuracy of a screening is dependent upon the image.

It is known that noise can produce undesirable artifacts in images. For example, correlated noise introduced during x-ray image capture and readout can cause distinct bands across an image. Electronic x-ray detectors can be divided into two classes—those in which direct methods are used to convert x rays into an electric charge and those in which indirect methods are used. Both direct- and indirect-conversion detectors accumulate and store the electronic charges received during x-ray exposure. In direct-conversion detectors, an x-ray photoconductor such as amorphous selenium directly converts x-ray photons into an electric charge. In indirect-conversion detectors, x-ray energy is converted into visible light using scintillators and then the light energy is converted into an electronic charge using photodetectors such as amorphous silicon photodiode arrays or CCDs. Typical x-ray detectors of either type (direct or indirect) are divided into an array of M rows by N columns (also referred to as channels) of picture elements (i.e., detector pixels). For example, a mammography detector may include 4096 rows and 3584 channels per row. An example detector array 10, comprised of rows 12 and channels 14, is shown in FIG. 1. Each channel is coupled to one of the charge amplifiers 16, while each row is coupled to one of the row drivers 15. During x-ray exposure, the electric charge at each pixel location of the detector array is accumulated and stored. The electric charge relates to the number of photons received at the pixel during the x-ray exposure and is representative of the attenuation experienced by the individual transmitted x-rays as they travelled through an imaged object. Following x-ray exposure the electric charge pattern of the detector is read out and converted to a digital image, where the brightness of the individual pixels of the digital image directly relates to the electronic charge of the detector pixel and enables a visual representation of the internal structure of the imaged object. During detector readout, rows are sequentially accessed by the row drivers, and the charge of a pixel in each channel of the accessed row is sampled by charge amplifiers 16. However, external noise can influence the pixel charge, and the noise effect is correlated when sampling times are correlated. This is problematic because correlated noise phase differences between rows appear as bands across the resulting image. It is thus desirable to reduce the effects of correlated noise in captured images for various modalities.

SUMMARY OF THE INVENTION

According to one aspect of the invention an apparatus comprises, in association with a device which generates a portion of an image from a plurality of channels within a first row by sampling each channel during a sampling time corresponding to the channel, circuitry which offsets sampling times of at least first and second channels within the first row, thereby reducing noise correlation between the first and second channels in the first row.

According to another aspect of the invention a method comprises generating a portion of an image from a plurality of channels within a first row by sampling each channel during a sampling time corresponding to the channel, including offsetting sampling times of at least first and second channels within the first row, thereby reducing noise correlation between the first and second channels in the first row.

An advantage associated with at least one embodiment of the invention is reduction of correlated noise effects. This advantage is achieved by offsetting the pixel sampling times of channels within a row relative to each other, thereby decorrelating channel sampling. Decorrelation may be accomplished with different techniques. For example, start times of the channels within a row, end times or both may be offset. This may be accomplished using a predetermined set of sampling time values or by randomizing sampling time values. Offsetting sampling times within a row reduces noise correlation between channels in the row because different phases of the noise signal are sampled on each channel, effectively blurring or dithering the channel noise within each row. Random sampling within the channel, such as by varying a channel sampling time between rows, further dithers the noise within each channel.

BRIEF DESCRIPTION OF THE DRAWINGS

FIG. 5 is an image which illustrates several regions of correlated noise effects.

DETAILED DESCRIPTION

The invention will be described in the context of an x-ray image. However, the invention is not limited to use with x-ray equipment and those skilled in the art will appreciate that the invention may be implemented with various other modalities including but not limited to positron emission tomography (PET), single photon emission computed tomography (SPECT), magnetic resonance imaging (MRI) and optical imaging, e.g., using CCDs. It will also be appreciated that the invention is not limited to medical applications, and will have utility in image processing for various other purposes.

Figure 1:
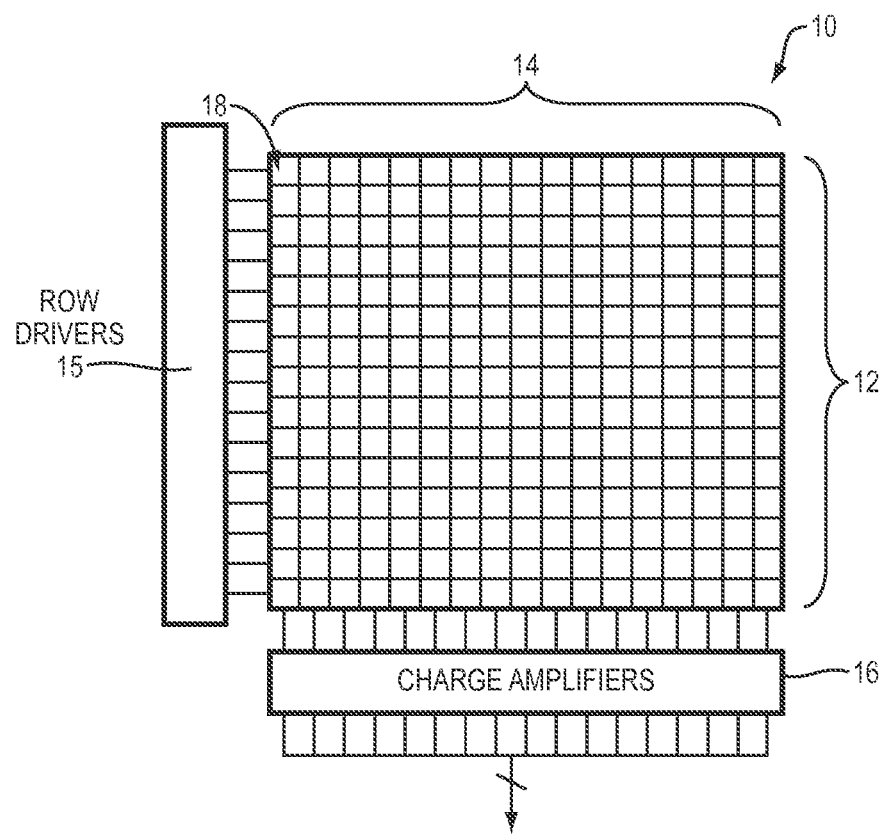
FIG. 1 illustrates an example detector array.
Figure 2:
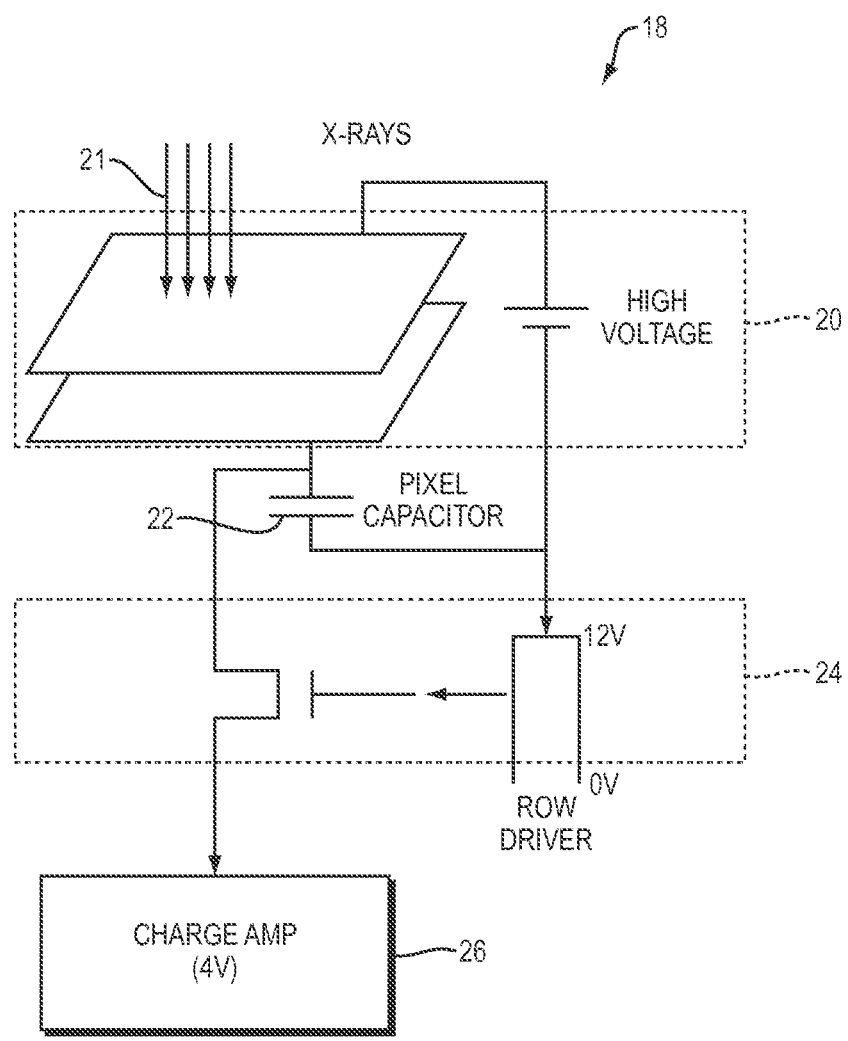
FIG. 2 illustrates an exemplary schematic of a single pixel of the pixel array.

FIG. 2 illustrates an exemplary schematic of a single pixel 18 of the pixel array 10. The pixel 18 includes a thin film transistor (TFT) switch 20, a pixel capacitor 22, a row driver 24 and a charge amplifier 26. As x-rays 21 impinge upon the detector, charge accumulates at the pixel capacitor 22. Following x-ray exposure the pixel capacitor stores a charge representative of the x-ray attenuation at the pixel location. When row driver 24 is asserted the voltage across the pixel capacitor 22 is transferred via TFT 20 to the charge amplifier 26. The charge amplifier converts x-ray charge to voltage and sends it to ADC for digitization.

Figure 3:
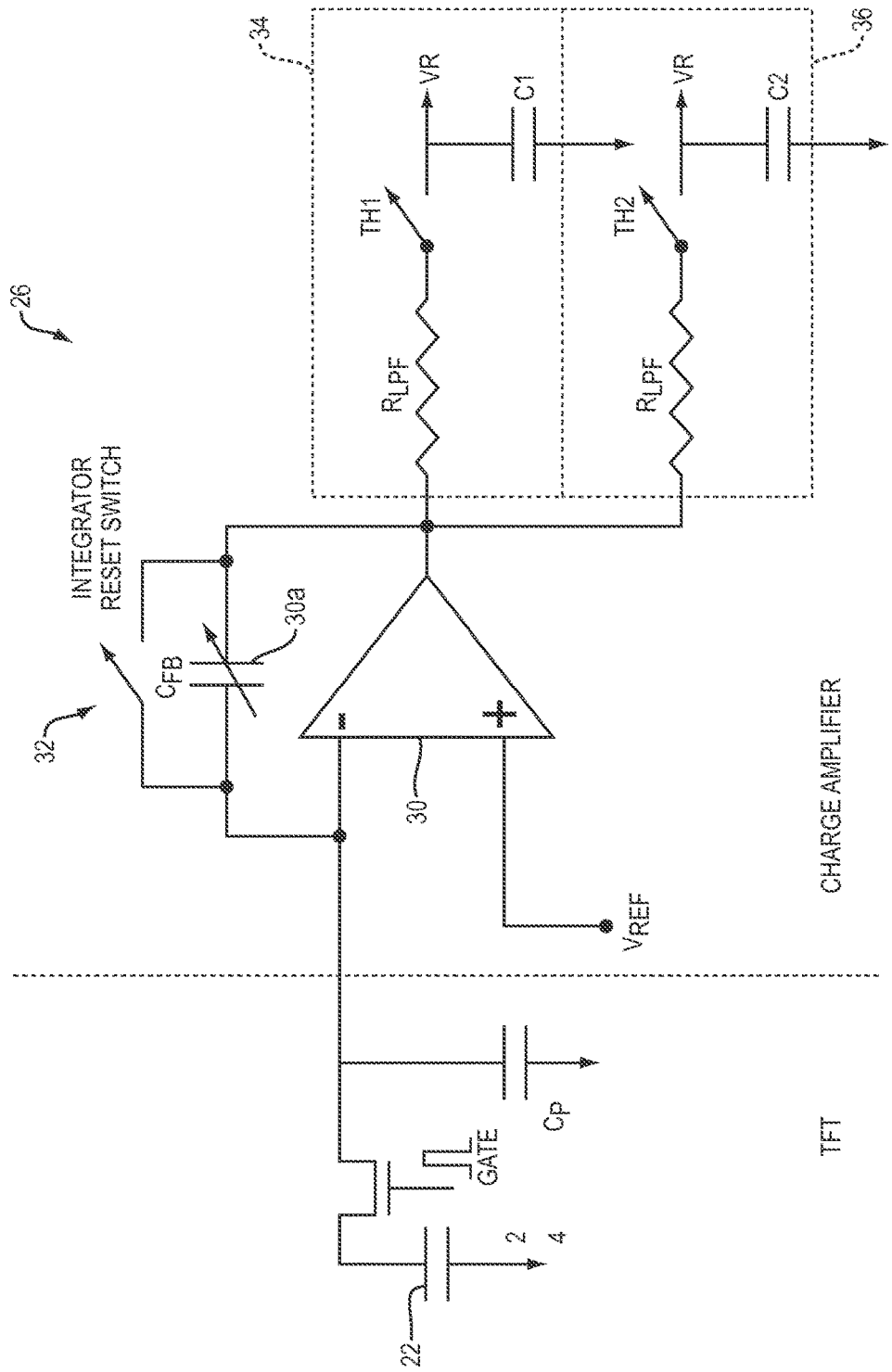
FIG. 3 is a schematic diagram of an exemplary embodiment of a charge amplifier.

FIG. 3 is a schematic diagram of an exemplary embodiment of a charge amplifier 26. The charge amplifier 26 is shown coupled to the row driver 24 and pixel capacitor 22 of FIG. 2. The capacitor Cp denotes capacitance of the source line (column line) to ground. This provides noise gain, which increases susceptibility of the system to ground noise or external noise picked up by source line and results in correlated noise. The illustrated charge amplifier 26 includes amplifier 30 coupled to integrator reset switch 32. The charge amplifier includes a pair of switched RC filters 34 and 36. The switched RC filters 34 and 36 have been used in charge amplifiers of the prior art to remove charge amplifier related offsets and reduce low frequency noise using a Correlated Double Sampling (CDS) scheme. The basis of the correlated double sampling scheme involves obtaining two voltage samples during an evaluation interval; the first sample recording system offsets and low frequency noise sources using a first RC filter 34, and a second sample recording the stored TFT pixel voltage using the second RC filter 36. The reference sampled voltage may then be subtracted from the sampled pixel voltage. Such an arrangement reduces low frequency noise and removes component related offsets from the final pixel value.

Figure 4:
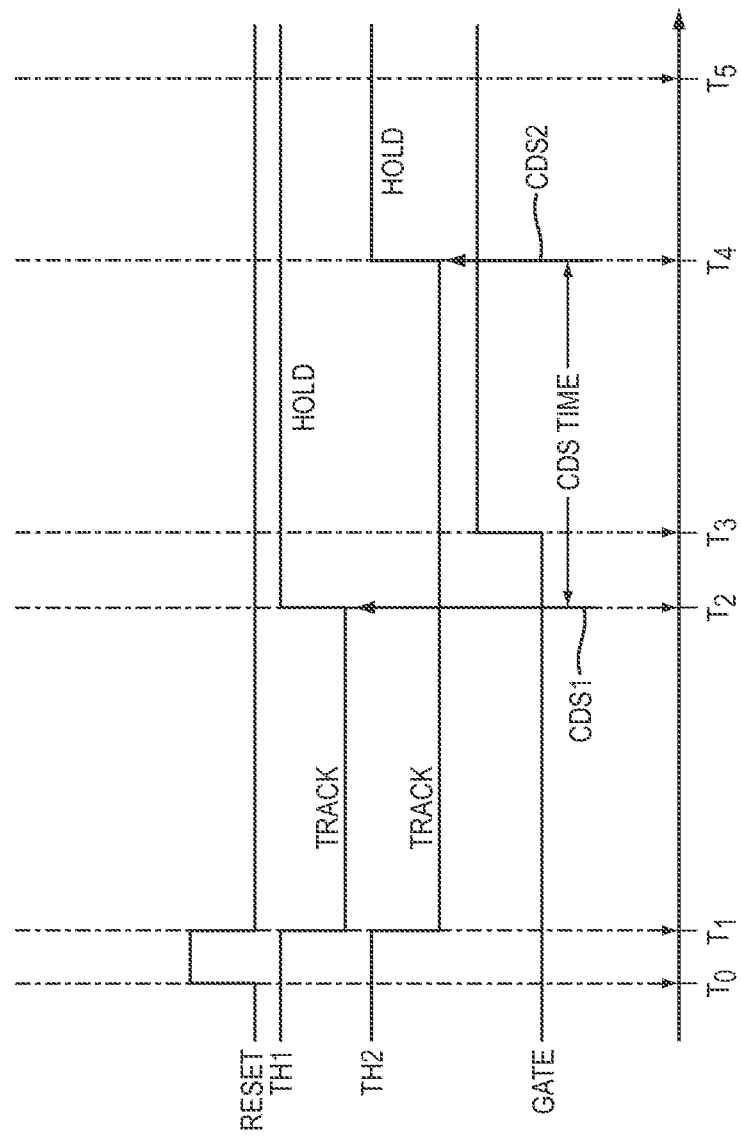
FIG. 4 is a timing diagram illustrating operation of the switched components of the charge amplifier of FIG. 3.

FIG. 4 is a timing diagram illustrating operation of the switched components of the charge amplifier of FIG. 3. RESET reflects the value of the signal controlling the Integrator Reset Switch 32, TH1, and TH2 reflect the values of the respective switches of RC filters 34 and 35, and GATE reflects the value of the signal which controls the Row driver 24. At the start (T0) of each evaluation interval, integrator switch 32 is reset briefly to remove any previous charge from the amplifier. At $T_1$, the Reset signal is released and switches TH1 and TH2 are closed, allowing capacitor C1 and C2 to start tracking any charge amplifier offsets. At $T_2$, switch TH1 is opened and the reference voltage (VR) is held by C1. At $T_3$ the Gate signal is turned ON and the charge from the pixel capacitor 22 is transferred to node 30a of amplifier 30, providing output to RC filter 36 and charging capacitor C2. At time $T_4$, (CDS2) switch TH2 is open, and the voltage VS is held at capacitor C2. Thus, during the "CDS Time" (i.e., the time interval between CDS1 and CDS2) the charge from the pixel capacitor 22 is amplified, filtered and held as voltage VS. VR is subtracted from VS to remove the system offsets and reduce low frequency noise, and the difference is subsequently forwarded to an A/D converter for digitization.

One common problem encountered by x-ray detectors which use CDS is horizontal correlated noise. Since CDS1 and CDS2 times are identical for all channels, an external noise signal has equal effect on all channels within a row. However the noise phase may be different from row to row. The resulting offset caused by noise being captured in different phases results in pixel value offsets between rows which shows up in bands across the resulting image. The severity of correlated noise effects can be worse in detector systems where other sources of noise are lowered significantly. FIG. 5 is an image which illustrates several regions of correlated noise, such as region 52. Such artifacts reduce the overall quality of the image, diminishing its effectiveness for use in cancer screening.

According to one aspect of the invention it is realized that the correlated noise effects may be reduced by offsetting the pixel sampling times of channels within a row relative to each other. For example, start times (CDS1) of the channels within a row, end times (CSD2) or both may be offset. This may be accomplished using a predetermined set of pseudo-random sampling time values or by randomizing sampling time values. Offsetting sampling times within a row reduces noise correlation between channels in the row because different phases of the noise signal are sampled on each channel. Using this technique, referred to as Decorrelated Channel Sampling, effectively blurs or dithers the channel noise within each row. Offsetting sampling within the channel, by varying a channel CDS time between rows, further dithers the noise within each channel.

The CDS Time (total pixel data tracking time) is preferably kept constant so that any shift in the start time CDS1 of the sample results in a corresponding shift in the end time CDS2 of the sample. Keeping the CDS Time constant, while varying the CDS1 and CDS2 times, ensures that the charge amplifier is still equally effective in removing system offsets and reducing low frequency noise, with the added advantage of reduced correlated noise effects.

It should be noted, however, that it is not a requirement of the invention that the CDS Time remains constant, and other embodiments of the invention are envisioned wherein the CDS Time varies between channels in a common row, and within a channel between rows, provided at least a minimum CDS Time for obtaining an adequate sample of the pixel value is maintained.

Thus the present invention envisions a pixel sample start window (PSSW). The PSSW may include a plurality of start time slots, where the time slots are randomly distributed among channels within a common row, and/or between rows of a common channel. The present invention further envisions a pixel sample end window (PSEW). The PSEW also includes a plurality of end time slots which may be matched in number to the number of start time slots of the PSSW, although it is not a requirement of the invention. The start and end time slots will be used to drive the respective TH1 and TH2 switches, which respectively control the start of the pixel sample interval and the end of the pixel sample interval.

Figure 6A:
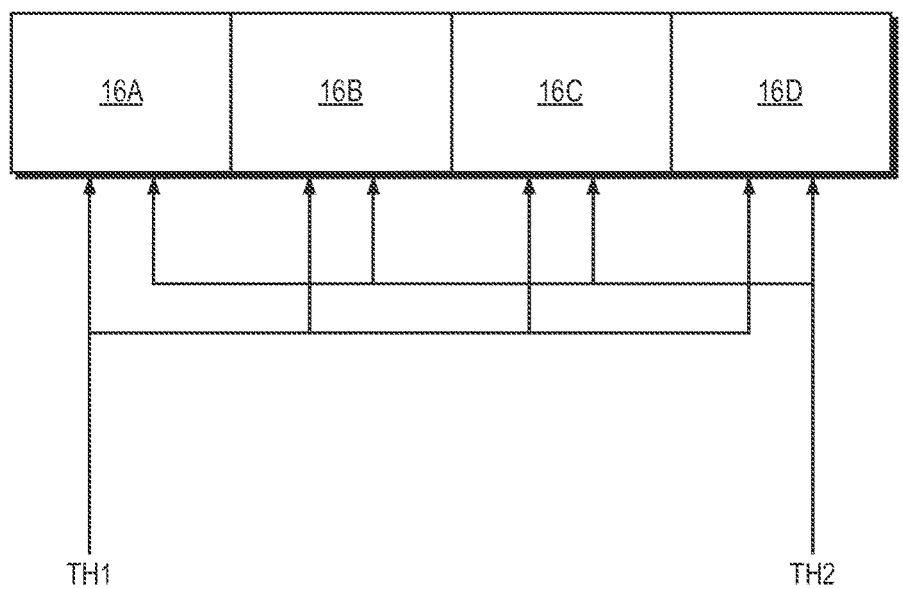
FIG. 6A illustrates the prior art technique of driving charge amplifiers.
Figure 6B:
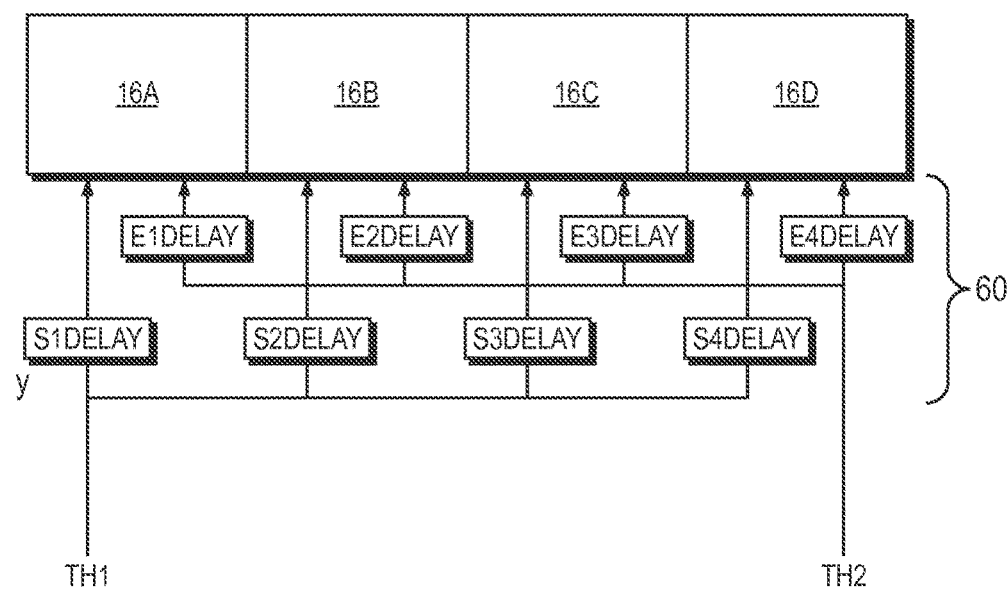
FIG. 6B illustrates an exemplary technique for providing independent control of the TH1 and TH2 signals for each charge amplifier.

Referring now to FIG. 6A, the prior art technique of driving the charge amplifiers 16 involved forwarding a common TH1 and TH2 signal to all of the charge amplifiers (here, four charge amplifiers 16A-16D are shown). In contrast, the present invention envisions independent control of the TH1 and TH2 signals. One exemplary technique for providing independent control of the TH1 and TH2 signals for each charge amplifier 16A-16D is shown in FIG. 6B. Each TH1/TH2 input has a dedicated, programmable delay line (indicated generally as group 60). In one embodiment, the programmable delay lines are programmed by random selection between a pre-identified number of slots. The programmable delay lines are advantageously re-programmed between charge amplifier read-out to ensure that the TH1 and TH2 signals vary between rows in a common channel, although it is not a requirement of the invention. Other techniques for randomly varying the TH1 and TH2 times among a select set of time slots may be substituted herein without affecting the scope of the invention.

Figure 7:
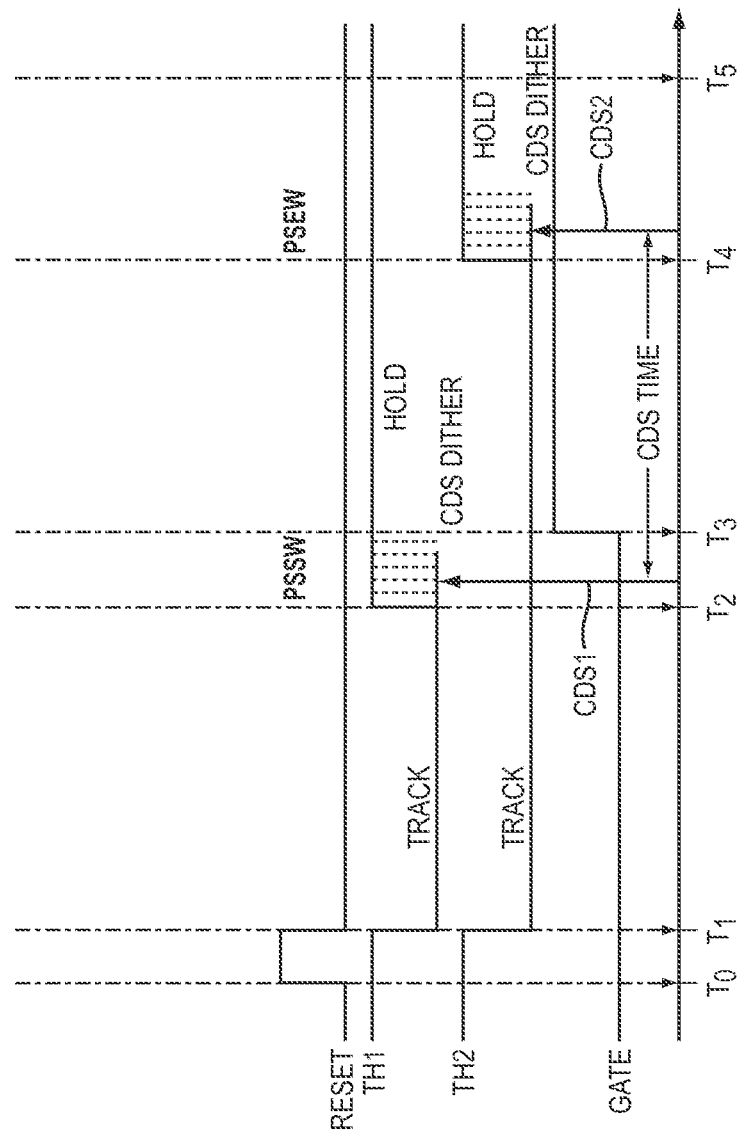
FIG. 7 is a timing diagram illustrating one embodiment of the invention which includes six pixel sample start time slots and six pixel sample end time slots in respective PSS and PSE windows.

FIG. 7 is a timing diagram illustrating one embodiment of the invention which includes six pixel sample start time slots and six pixel sample end time slots in respective PSS and PSE windows. A channel will be assigned a time slot during the PSS and PSE windows for CDS1 and CDS2 out of a finite number of slots. As a result, different phases of the noise signal by each channel and the effect of external noise on resultant image is randomized and correlated noise effects will be less visible in an image.

Figure 8:
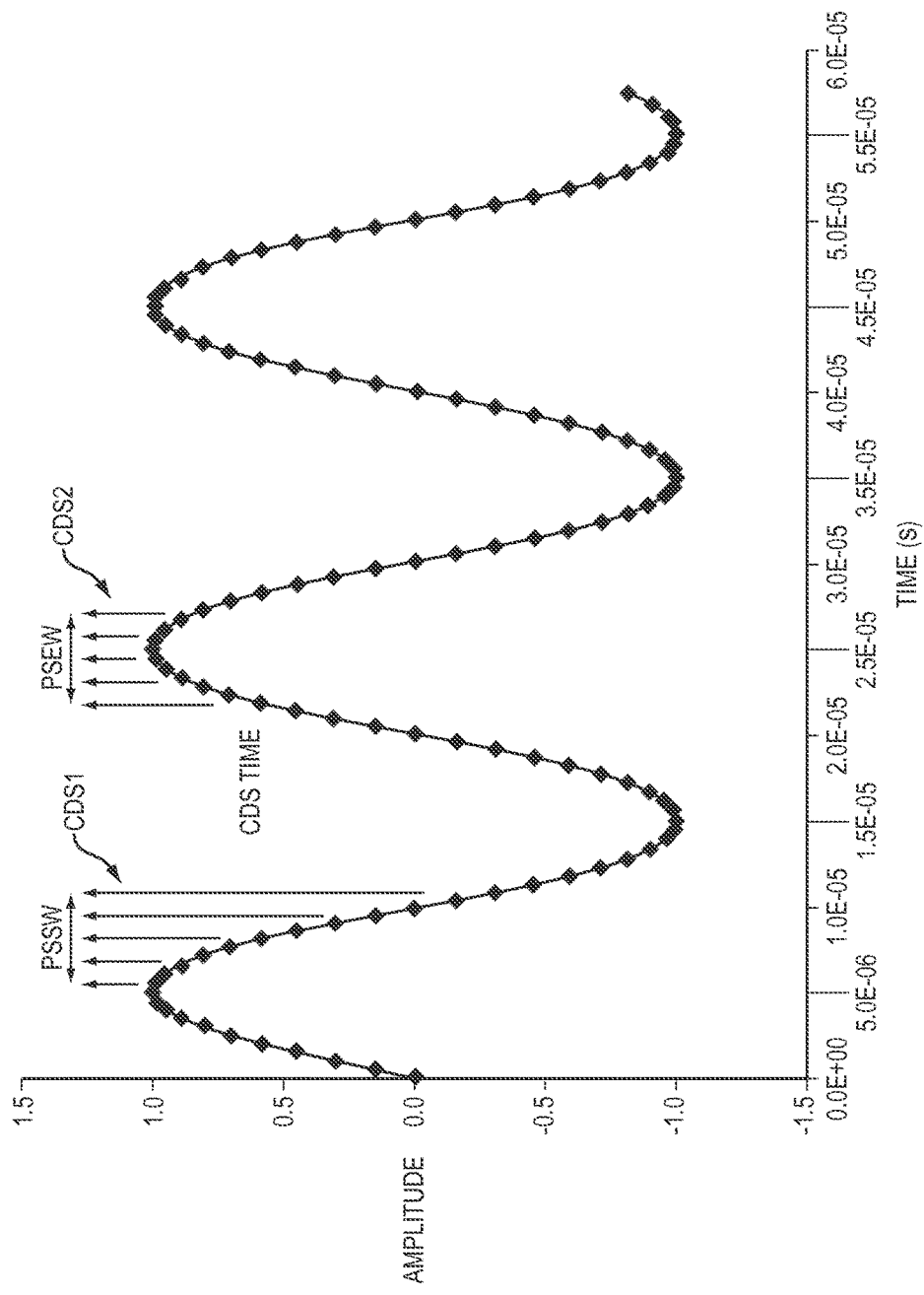
FIG. 8 illustrates external noise which may affect the digital detector.
Figure 9B:
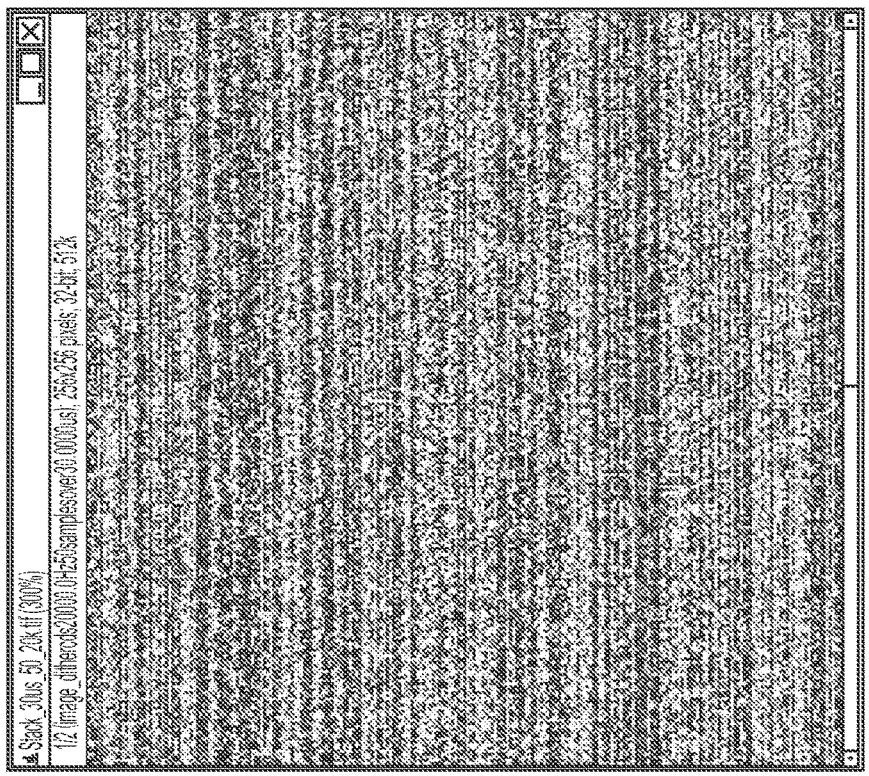
FIG. 9B illustrates reduction of the correlated noise effects of FIG. 9A by randomly varying the pixel sample time.
Figure 9A:
FIG. 9A illustrates correlated noise effects.
Figure 9D:
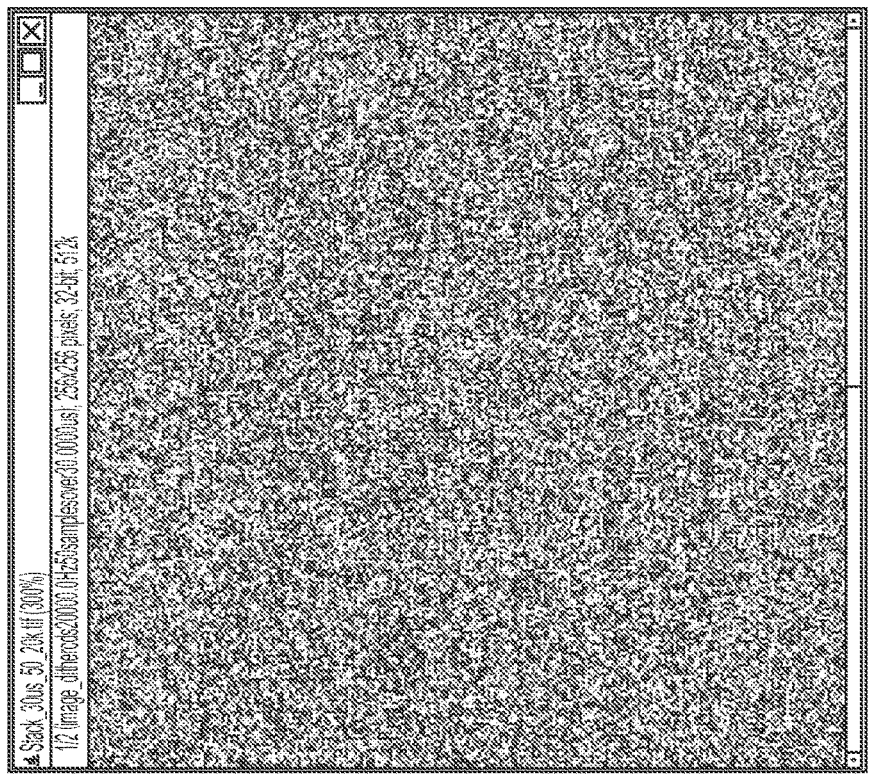
FIGS. 9C and 9D are simulated images of what may be acquired by a detector in the presence of 30 KHz of noise.
Figure 9C:
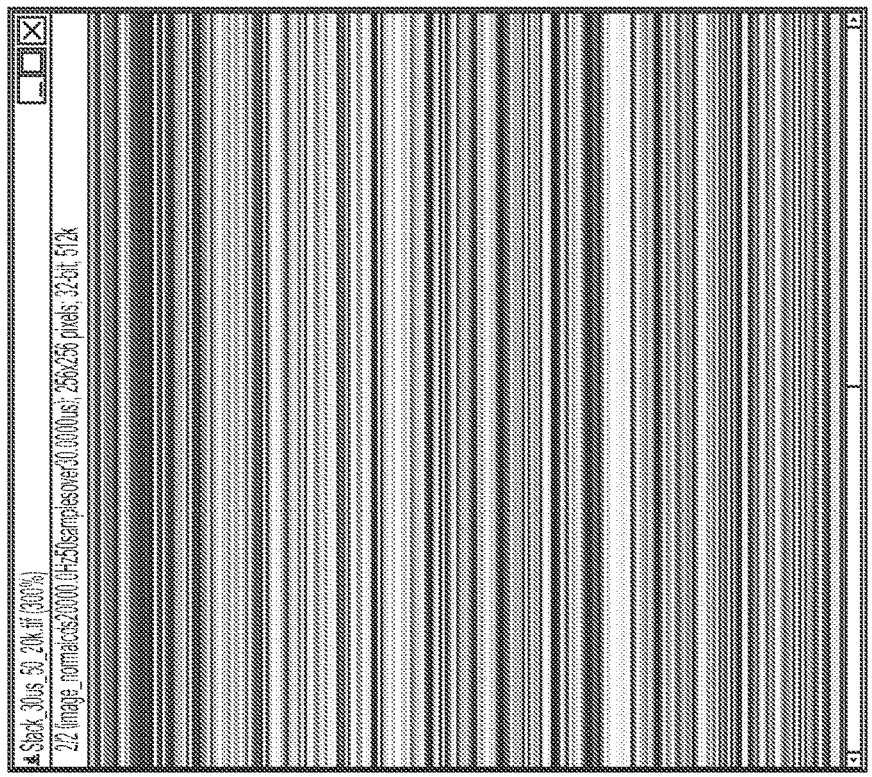

For example, FIG. 8 illustrates external noise which may affect the digital detector. It can be readily appreciated that if every channel in a given row sampled noise at one particular phase and the phase of the noise changes from row-to-row, the cumulative noise offset could vary between rows. FIG. 8 illustrates how the noise signal may be sampled by five different channels during a pixel acquisition. Because the noise is sampled at different phases, the effect of the noise is smoothed both across channels and between rows, reducing undesirable correlated noise effects. FIGS. 9A and 9B are simulated images of what may be acquired by a detector in the presence of 20 KHz of noise. The correlated noise effects, clearly visible in FIG. 9A, are drastically reduced by randomly varying the pixel sample time as described above, the results of which are shown in FIG. 9B. FIGS. 9C and 9D are simulated images of what may be acquired by a detector in the presence of 30 KHz of noise. While correlated noise effects are visible in 9C, when the pixel sample times are randomized among channels within a row and between channels in row, the correlated noise is drastically reduced as shown in FIG. 9D. The reduction in correlated noise between FIGS. 9B and 9D suggests that the present invention shows increased performance for higher frequency noise.

Figure 10:
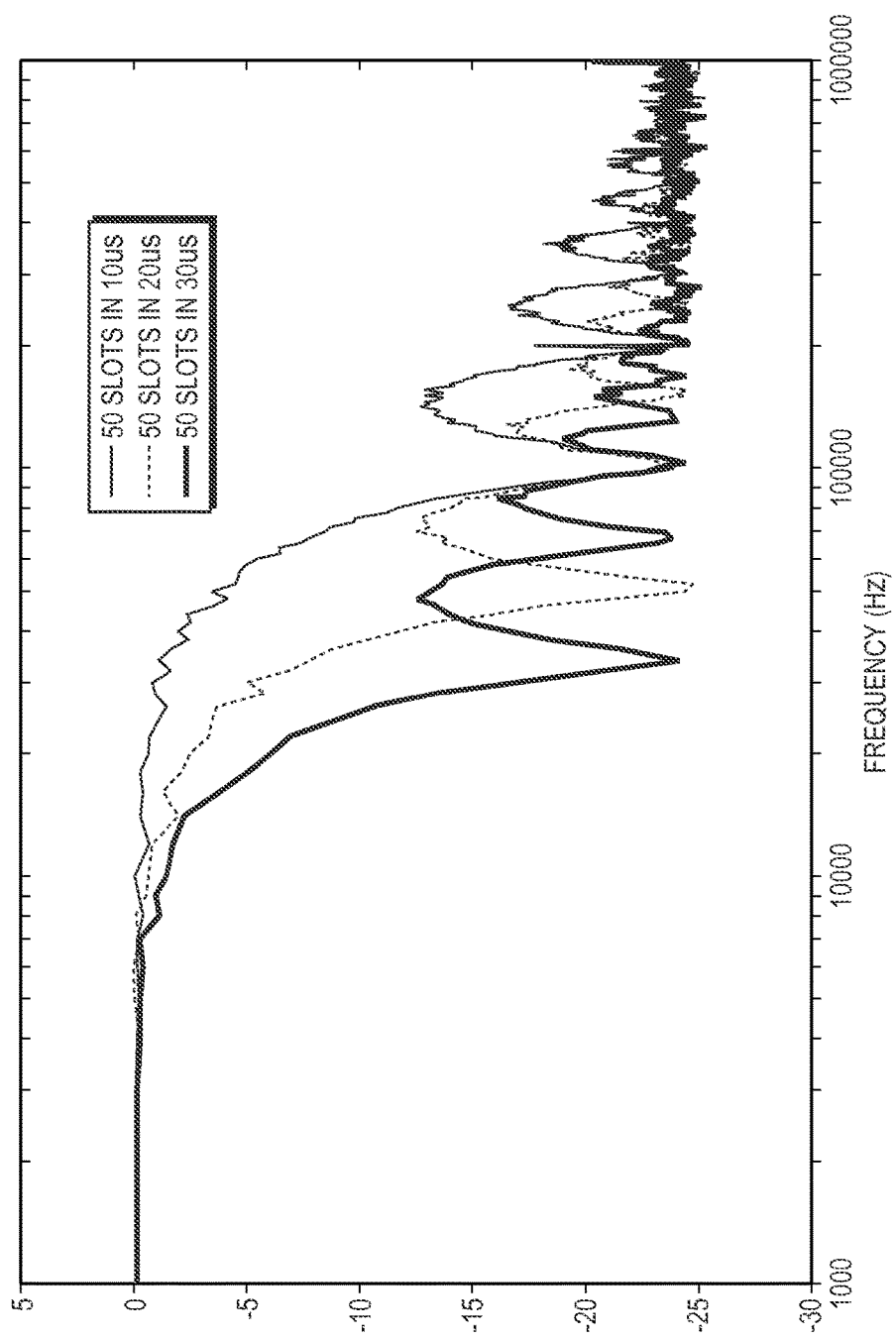
FIG. 10 is a graph of correlated noise amplitude of an acquired image vs. noise frequency.

FIG. 10 is a graph of correlated noise amplitude of an acquired image vs. noise frequency. In this simulation, PSSW and PSEW each were 10 microsecond windows apportioned into 50 time slots. Pixel start times for each channel were allocated to the 50 time slots in the 10, 20 and 30 microsecond window while the total CDS time remained constant. As shown in FIG. 10, the larger the dither window, the greater suppression of correlated noise can be achieved.

One aspect of the present invention involves the number of time slots and size of the PSS and PSE windows. It will be appreciated that the number of slots, size of windows and spacing of slots within a window are variables which are largely a matter of design choice, and will vary depending upon the size of the detector, the environment in which the detector is used, the desired speed of the detector and a desired cost and complexity of the design. Thus the present invention is in no way limited to any particular number of slots or any particular window size. Having said that, simulated use has found a reduction in correlated noise in digital images using a window size of 20 microseconds apportioned into 10-50 slots.

Accordingly an improved charge amplifier sampling system and method which reduces correlated noise artifacts via temporal variation of channel sampling within and between rows has been shown and described. The channel sampling technique may be used to improve the performance of both direct and indirect x-ray detectors by minimizing noise offsets between channels and rows. Although the present invention has been described as an adjunct to correlated double sampling charge amplifier, it will be readily appreciated by those of skill in the art that the present invention is not limited to use in a double sampling environment, but also may be used with many other data sampling systems which suffer from noise artifacts. Similarly, features of the invention may be implemented with the assistance of a computer program stored on a non-transitory computer readable medium. Having described exemplary embodiments, it can be appreciated that the examples described above are only illustrative and that other examples also are encompassed within the scope of the appended claims.

The invention claimed is:

1. An apparatus comprising:
    a device that generates a portion of an image from a plurality of columns within a first row by sampling each column during a sampling time corresponding to the column; and
    circuitry that offsets sampling times of at least first and second columns within the first row, thereby reducing noise correlation between the first and second columns in the first row, wherein the circuitry includes:
        a first charge amplifier associated with the first column; and
        a second charge amplifier associated with the second column, wherein the second charge amplifier is different from the first charge amplifier and wherein each of the first charge amplifier and the second charge amplifier has an input with a dedicated, programmable delay line.

2. The apparatus of claim 1 wherein sampling times are selected using at least one of randomization and pseudo-randomization.

3. The apparatus of claim 1 wherein at least one of the sampling times is different from all other columns.

4. The apparatus of claim 1 wherein the sampling time of each column within the first row is different from all other columns within the first row.

5. The apparatus of claim 1 wherein there are a plurality of rows, and wherein the sampling time of the first column within the first row is different from the sampling time of the first column within a second row.

6. The apparatus of claim 1 wherein there are a plurality of rows, and wherein the sampling time of each column within the first row is different from all columns within a second row.

7. The apparatus of claim 1 wherein the circuitry defines a pixel sample start window having a plurality of start time slots randomly distributed among columns within the first row.

8. The apparatus of claim 7 wherein the circuitry defines a pixel sample end window having a plurality of end time slots.

9. The apparatus of claim 8 wherein each of the first charge amplifier and the second charge amplifier has a first switched RC filter and a second switched RC filter for correlated double sampling, and wherein the start and end time slots drive switches of each of the first and second switched RC filters to respectively control a start of a pixel sample interval and an end of a pixel sample interval.

10. The apparatus of claim 1 wherein the programmable delay lines are programmed by random selection between a pre-identified number of time slots of a pixel sample window.

11. A system for channel sampling for digital imaging:
a detector array comprising a plurality of rows and a plurality of columns, the plurality of rows includes at least a first row and the plurality of columns including at least a first and a second column;
image generation circuitry that generates a portion of an image from the detector array by sampling each column during a sampling time corresponding to the column; and
sampling circuitry that offsets sampling times of at least the first and second columns within the first row, thereby reducing noise correlation between the first and second columns in the first row, wherein the circuitry includes:
a first charge amplifier associated with the first column; and
a second charge amplifier associated with the second column, wherein the second charge amplifier is different from the first charge amplifier and wherein each of the first charge amplifier and the second charge amplifier has an input with a dedicated, programmable delay line.

12. The system of claim 11, wherein sampling times are selected using at least one of randomization and pseudo-randomization.

13. The system of claim 11, wherein at least one of the sampling durations is different from all other columns.

14. The system of claim 11, wherein the sampling time of each column within the first row is different from all other columns within the first row.

15. The system of claim 11, wherein the sampling time of the first column within the first row is different from the sampling time of the first column within a second row.

16. The system of claim 11, wherein there are a plurality of rows, and wherein the sampling time of each column within the first row is different from all columns within a second row.

17. The system of claim 11, wherein the circuitry defines a pixel sample start window having a plurality of start time slots randomly distributed among columns within the first row.

18. The system of claim 11, wherein the circuitry defines a pixel sample end window having a plurality of end time slots.

19. The system of claim 11, wherein each of the first charge amplifier and the second charge amplifier has a first switched RC filter and a second switched RC filter for correlated double sampling, and wherein the start and end time slots drive switches of each of the first and second switched RC filters to respectively control a start of a pixel sample interval and an end of a pixel sample interval.

20. A medical imaging system:
an x-ray detector array comprising a plurality of rows and a plurality of columns, the plurality of rows includes at least a first row and the plurality of columns including at least a first and a second column;
sampling circuitry that offsets sampling times of at least the first and second columns within the first row, thereby reducing noise correlation between the first and second columns in the first row, wherein the circuitry includes:
a first charge amplifier associated with the first column; and
a second charge amplifier associated with the second column, wherein the second charge amplifier is different from the first charge amplifier and wherein each of the first charge amplifier and the second charge amplifier has an input with a dedicated, programmable delay line.

* * * * *